April 29, 1930.　　　W. H. IVES　　　1,756,751
WINDSHIELD WIPER BLADE
Filed Jan. 19, 1928
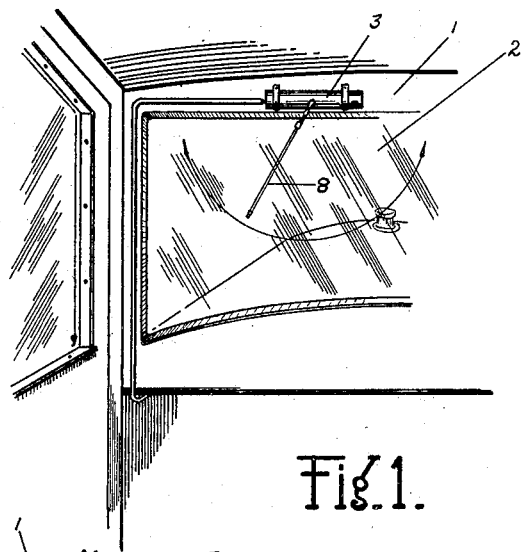
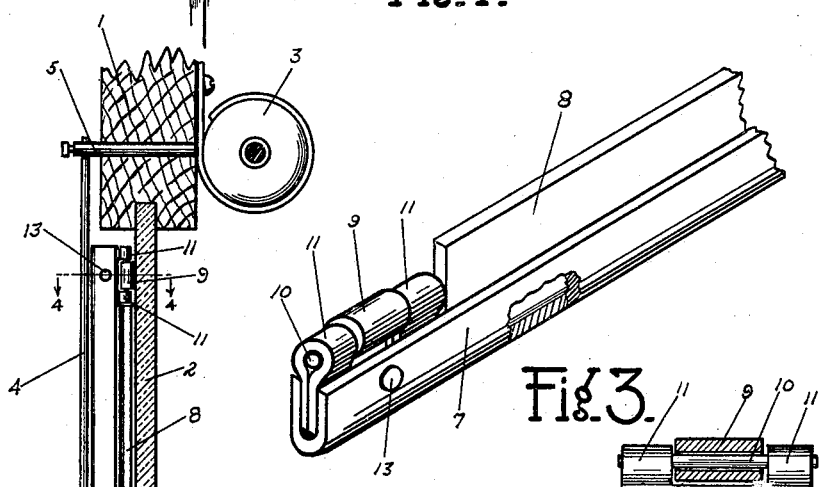
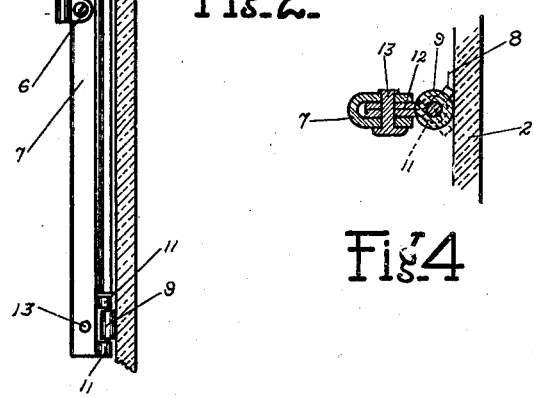
INVENTOR.
WILLIS H. IVES.

Patented Apr. 29, 1930

1,756,751

UNITED STATES PATENT OFFICE

WILLIS H. IVES, OF OWEGO, NEW YORK

WINDSHIELD-WIPER BLADE

Application filed January 19, 1928. Serial No. 247,939.

My invention relates generally to blades for windshield wipers of the pivoted or reciprocating type whereon there is provided a strip of rubber wiping material adapted to flex and turn in opposite directions as the wiper moves back and forth.

As is commonly known, with blades of this character, the projecting strip of rubber wiping material is often forced too tightly against the glass windshield resulting in unduly bending the rubber with the detrimental result that as the wiper blade moves to and fro, the rubber does not flex and reverse its wiping position, but remains bent in one direction thereby reducing its effectiveness at least by half. Furthermore, such bending often causes the wiper element to break at the point of bending over the usual sharp edge of the holder, thereby rendering it entirely useless. The primary object of my invention is to overcome this difficulty and provide a wiper blade with means for preventing such detrimental bending of the rubber wiper, and which insures at all times the proper flexing and reversing of the wiper element as it moves back and forth, and eliminates the possibility of the element being broken.

A still further object is to provide such a means which offers a minimum amount of friction against the normal operation of the wiper.

A still further object is the provision of such a wiper blade which is simple in construction, economical in manufacture, and which because of the foregoing characteristics, gives greater service for a longer period than the ordinary type of wiper blade now in use.

Other objects and advantages in details of construction and operation will be apparent as the description proceeds, reference now being had to the figures of the drawing, wherein like reference numerals indicate like parts.

In the drawing:—

Figure 1 is a detail view of one corner of an automobile showing a windshield wiper of common design with which my improved wiper blade is adaptable.

Figure 2 is a detail cross sectional view illustrating the use of my invention on a windshield.

Figure 3 is a detail perspective view of one end of my improved wiper blade.

Figure 4 is a detail cross sectional view taken on the line 4—4 of Figure 2.

Figure 5 is a detail side view partly in section, illustrating the anti-friction device employed on my wiper blade.

The reference numeral 1 indicates generally the interior of an automobile directly above the windshield 2, at which point there is suitably mounted the operating mechanism 3 for a windshield wiper, the blade of which is positioned outside the windshield and operable either by hand, electricity, or suction.

I have illustrated my invention in connection with that type of wiper which pivots to and fro, although it will be understood that my invention is not limited to this particular type.

The supporting arm 4 is secured at one end to a stub shaft 5 by means of which said arm receives its pivotal or rocking motion. Secured centrally to the free end of the arm 4, as at 6, is my improved wiper blade 7, formed preferably of a single strip of metal bent upon itself to form a channel within which is received one edge of the rubber wiping element 8 securely held in position by the bending of the channel member 7 tightly against it. The projecting free edge of the member strip 8 is adapted to engage with the windshield 2 and forms the wiper element therefor, and it will be noted with reference to Figure 3 that such projecting portion of the wiping element 8 extends considerably beyond the blade 7.

In order to prevent the wiping element 8 being pressed too closely into contact with the windshield 2, and thereby causing it to bend to a detrimental degree, I have provided at either end of the blade 7 an anti-friction roller 9 rotatable upon a pintle 10 supported at its ends in bearings 11, the lower ends of which are integral with each other as at 12, and securely clamped within the channel formed by the blade 7, preferably being positively secured in such position by means of a rivet 13. It will be noted with reference to Figures 3, 4 and 5, that the bearings 11 for the pintle 10 and roller 9 are formed from a single piece of metal bent upon itself, and being spread at the point of bending to permit the insertion of the pintle 9, and then cut away as at 14 to receive the anti-friction roller 9.

It will be observed from Figures 2 and 3 that the periphery of the anti-friction roller 9 is located above the edge of the blade 7 and below the free edge of the wiper element 8. Consequently when the blade is forced into engagement with the windshield 2, the wiper element 8 will flex and bend against the windshield 2 sufficient to provide a good tight wiping surface, but will not be permitted to bend completely due to the engagement of the anti-friction rollers 9 against the windshield. Therefore, when the wiper blade is moved back and forth over the windshield 2, the rubber wiping element 8 will be free to flex and reverse its bending upon each reversal of direction of the blade. The rollers 9 of course offer little or no friction to the operation of the wiper.

Of course, changes may be made in details of construction and arrangement of parts without departing from the spirit and scope of my invention. I do not limit myself, therefore, to the exact form and materials herein shown and described other than by the appended claims.

I claim:—

1. A windshield wiper blade comprising a channel formed holder, a wiper element secured therein, roller supports secured in the channel of said holder adjacent its ends, and rollers on said supports, the plane of said rollers lying below the plane of the free edge of said wiper element.

2. A windshield wiper blade comprising a channel formed holder, a wiper element secured therein, roller supports secured in the channel of said holder adjacent its ends, and rollers on said supports, the plane of said rollers lying below the plane of the free edge of said wiper element, said roller supports comprising strips bent upon themselves and provided with pintles for said rollers.

WILLIS H. IVES.